United States Patent [19]

Chen et al.

[11] Patent Number: 5,062,865

[45] Date of Patent: Nov. 5, 1991

[54] CHEMICALLY BONDED SUPERABRASIVE GRIT

[75] Inventors: Sy-Hwa Chen; Chien-Min Sung, both of Salt Lake City, Utah

[73] Assignee: Norton Company, Worcester, Mass.

[21] Appl. No.: 441,341

[22] Filed: Nov. 22, 1989

Related U.S. Application Data

[63] Continuation of Ser. No. 274,651, Nov. 18, 1988, abandoned, which is a continuation of Ser. No. 128,971, Dec. 4, 1987, abandoned.

[51] Int. Cl.$^5$ .............................................. B24D 3/00
[52] U.S. Cl. ...................................... 51/295; 51/295; 51/309; 427/217
[58] Field of Search .................. 51/293, 295, 309; 427/217

[56] References Cited

U.S. PATENT DOCUMENTS

| | | |
|---|---|---|
| 3,520,667 | 7/1970 | Taylor .................................. 51/295 |
| 3,650,714 | 3/1972 | Farkas .................................. 51/295 |
| 3,757,878 | 9/1973 | Wilder et al. ....................... 175/329 |
| 3,757,879 | 9/1973 | Wilder et al. ....................... 175/329 |
| 3,841,852 | 10/1974 | Wilder et al. . |
| 3,871,840 | 3/1975 | Wilder et al. . |
| 3,904,391 | 9/1975 | Lindstrom et al. ................. 51/295 |
| 3,984,214 | 10/1976 | Pratt et al. .......................... 51/295 |
| 4,378,975 | 4/1983 | Tomlinson et al. ................. 51/309 |
| 4,399,167 | 8/1983 | Pipkin ................................. 427/217 |
| 4,539,018 | 9/1985 | Whanger et al. ................... 51/295 |
| 4,606,738 | 8/1986 | Hayden ............................... 51/295 |

*Primary Examiner*—William R. Dixon, Jr.
*Assistant Examiner*—Willie J. Thompson
*Attorney, Agent, or Firm*—Marmorek, Guttman & Rubenstein

[57] ABSTRACT

Superabrasive grits such as diamond or CBN is chemically bonded with a coating such as tungsten which is in turn bonded to a tool body providing superabrasive cutting tools such as saw blades, grinding wheels, drill bits and the like.

22 Claims, No Drawings

CHEMICALLY BONDED SUPERABRASIVE GRIT

This is a continuation of application Ser. No. 274,651, filed Nov. 18, 1988, which is a continuation of application Ser. No. 128,971, filed Dec. 4, 1987, both now abandoned.

BACKGROUND OF THE INVENTION

The present invention relates to a novel coated superabrasive grit which is useful for producing improved abrasive or cutting tools. The present invention also includes within its scope the tools thus produced embodying the coated grit.

Superabrasives grit such as diamond and CBN, attached to a supporting body, is widely used for removing materials. Typical applications include, for example, sawing, drilling, dressing, grinding, lapping and polishing.

In typical applications, the grit is held in a suitable matrix and attached to a tool body. The retention of the grit is primarily accomplished by mechanical means, such as by surrounding the grit with the matrix material. This method of attachment, although simple and practical, has limitations because the exposure of the grit must be limited so as not to weaken the mechanical grip of the surrounding matrix. As a result, the cutting rate is limited by the small grit exposure. Further, as the matrix is worn down, the retention becomes insufficient so the grit can be "pulled out" and lost. For example, in a typical saw blade application, the average exposure of the diamond grit is less than 20% of the total grit height, and the grit is often lost due to the pull-out when it is worn down to about $\frac{1}{3}$ of its original size. After using this saw blade for some time, typically about $\frac{1}{3}$ of the original grit is lost as evidenced by the empty pockets on the blade.

In order to overcome this problem, coating of grit has be attempted to improve the bonding strength. U.S. Pat. No. 3,650,714 to Farkas describes a process for applying such coating on a diamond grit. Typical commercially available coated superabrasives products include De-Beer Co.'s titanized products for saw grit and General Electric Co.'s titanized products for CBN grit. For all metal matrix superabrasives tools the only commercially available coating for grit is titalized products.

However, it has been found that titanized products, particularly for diamond grit, are not effective in improving the attachment strength. The performance evaluation i.e. life & cutting rate of titanized grit in saw blade applications did not show noticeable improvement. One problem encountered by the titanized product is its lack of resistance against oxidation. It is well known that Ti or TiC can be oxidized in most saw blade manufacturing conditions. The oxidation can destroy the bonding between the grit and coating material, and between the coating material and the matrix. The other problem titanized products faced is the thinness of the coating. Titanized products typically contain less than 1 micron thick of Ti or TiC. Such a thin coating can not prevent the dissolution or removal of the coating from the grit surface by the matrix material during rhe manufacturing process for tools. U.S. Pat. Nos. 3,757,878 and 3,757,879 to Wilder describe an encapsulation method for diamond particles. However, this is directed to produce a mechanical envelope for the grit and no chemical bonding is achieved.

SUMMARY OF THE INVENTION

It is an object of this invention to provide a chemically coated superabrasives grit.

Another object of this invention is to provide a firm attachment of the grit in the matrix body of a tool.

It is also an object of this invention to provide a continuous thick coating of at least 1 micron on the superabrasives grit so the integrity of coating can be maintained after tool manufacturing process.

It is still another object of this invention to provide a coating material which is substantially inert to oxidation during tool manufacturing processes.

Yet another object is to provide abrasive or cutting tools embodying such chemically bonded coating superabrasive for improved material removal performance.

A further object is to provide tools with the chemically coated abrasive grit exhibiting better grit retention, larger grit protrusion, and freer cutting action. These tools include, for example saw blades, grinding wheels, dressing tools, drill bits, and lapping tools.

The term "superabrasive" used hereinafter and in the claims means natural, as well as synthetic diamond and cubic boron nitride (CBN).

The term "chemical bonding" as used herein is distinguishable from mechanical bonding. In the latter case, there is no reaction between the two joining members. In the case of "chemical bonding", there is a reaction on the interface between the two joining members. The reaction may be, for example, a carbide formation, a boride formation, a nitride formation, or a solution formed by inter-diffusion between the two joining members.

The term "drill bit" used hereinafter and in the claims contemplates not only machine tool type drill bits but also includes drill bits and core bits such as those commonly employed in the mining and petroleum industry for earth boring.

According to the present invention, there is provided a superabrasive grit which is coated with a relatively non-oxidizable metal of at least one micron thickness that is strongly bonded to the surface of the grit by a chemical bond. Briefly, the grit is coated with a metal which is not readily oxidizable selected from W, Ta, Mo, Nb or alloys thereof. The coated grit is then thermally treated either before or during the manufacturing process for tools to form a strong chemical bond between the coating and the grit such as a carbide layer in the case of a diamond grit. Tungsten is the preferred metal, for the coating. The surface of the grit can optionally be roughened by either chemical or mechanical means before being coated to enhance subsequent bonding. The composition of the matrix must be compatible with the coating materials selected for the grit so that under the processing conditions for tool manufacturing, the matrix will be chemically bonded to the coating material. The result is a firmly attached chemically bonded coated superabrasive grit in a tool matrix.

The interfaces between the superabrasive grit and the coating, and between the coating and the matrix are formed by strong chemical bonds. This is distinguished from prior art practices where the attachment of grit is primarily achieved mechanically by the surrounding matrix material. The coated superabrasive grit when embodied in a tool in accordance with this invention has the following advantages:

1. longer life due to less grit pull-outs;

2. higher cutting rate due to larger grit protrusion; and
3. freer cutting with lower force, lower power, less heat generation due to larger grit protrusion.

The coated superabrasive according to this invention is particularly suitable for grit in drill bits such as, for example, a sub-component of a cutter having a particular physical form such as circle, oval, blade and the like; or as an actual cutting component itself, as when the grit is incorporated in the actual matrix of the bit protruding from the surface thereof, wearing away, and exposing other pieces of grit bonded to the matrix. This is particularly suitable for core bits, although other bits for hard formations can be similarly manufactured.

DETAILED DESCRIPTION OF THE INVENTION

According to this invention, the superabrasives grit surface is first roughened by mechanical or chemical means. The roughening produces an uneven surface which improves the adherence of the grit to the coating material to be applied later. This improvement of adherence is the result of increased chemical reactivity of the grit surfaces due to much higher amount of surface imperfections. The number of unbonded electrons of carbon on the surface will also increase, thereby enhancing the reaction between the grit and the coating material. The unevenness of the surface can also strengthen the mechanical attachment of the grit to the coating material due to the larger surface area of close contact.

In the practice of this invention, the grits are optionally roughened at first. A preferred roughening is to form a uniformly distributed frosted surface. This roughening is accomplished by either mechanical means, such as by milling with other superabrasive powders, or chemical means such as by oxidation or etching. For example, a grit can be tumbled in air or enriched oxygen atmosphere at high temperature to allow even oxidation on all surfaces. A fluidized bed chemical vapor deposition (CVD) system or a rotary furnace can both be advantageously employed to produce the desired results. For chemical etching processes, oxidants such as potassium dichromate or potassium nitrate may be optionally used. Employing either method, the weight loss of the grit during the surface roughening treatment should be controlled to be less than 5% w/w.

Although the surface roughening is an important step according to this invention, it may not be necessary for some applications. For example, for smaller sized grit applications, such as for polishing cloths using micron powders, the roughening step may be eliminated.

After the surface roughening treatment, the grit is washed and chemically cleaned to remove surface contaminants by methods known in the art. For example, washing the grit in mineral acids such as with a solution of nitric or hydrochloric acid, or heating the grit under hydrogen atmosphere can eliminate most surface contaminants.

After surface cleaning, the grit is coated with a material which is relatively oxidation resistant, and which is a carbide former such as W, Ta, Mo, and Nb, or an alloy thereof forming a continuous layer having a thickness of at least 1 micron. The coating thickness can vary from about 1 micron to about 50 microns and preferably from about 1 micron to about 30 microns. Such a coating is readily distinguishable from coatings known in the art. See for example, the coating obtained in accordance with the description in Farkas U.S. Pat. No. 3,650,714 which is much thinner than 1 micron. This distinction is also applicable for other commercially available titanized products.

In the case where diamond grit is used, a carbide is formed between the grit and the coating material by heating the coated grit to carbide forming temperatures. Where CBN is used a nitride bond is formed. As a suitable alloy coating there may be mentioned for example, W-NiB.

After the first coating material is applied to the grit, a second coating or any additional layers of coating can be optionally applied over the first layer. The purpose of the multi-layers is to provide additional protection of the first coating layer from oxidation in the air or from dissolution into the matrix material during the manufacturing process of the tool, and/or during the cutting action of the tool. The outer coating can also provide a better metallurgical joint with the matrix bond material so as to form a diffusion bonded interface. For most applications, the outer coating layer need not contain a carbide former. For example, an electroless outer coating of copper can be used to bond with certain matrix materials.

The coating is typically applied by known methods such as chemical vapor deposition described by Wilder in U.S. Pat. No. 3,757,878. These methods are used to apply these mechanical layers which do not normally contain oxidation resistant carbide formers.

The chemical bonding between the grit and the coating is achieved by a way depending upon the desired final product. Thus for example, if the grit is to be embodied in a saw blade, the processing conditions to form the blade, especially the temperature required to form the blade, will be sufficient to cause the formation of the chemical bonding. On the other hand, if the desired end product is formed at different process conditions which will not induce sufficient chemically bonding, the coated grit is pre-treated under conditions such as in a furnace for example at an effective carbide forming temperature such as about 850° C. to cause the formation chemical bonding before using the grit in the end product.

After the coating is applied to the grit, the coated grit can be used like an uncoated one for the subsequent processing for making tools. In the case of making a saw blade for example, the grit is mixed with a well blended matrix metal powder and then either hot pressed at about 800° C. to 1000° C. to shape, or infiltrated with a binder alloy. The result is a saw blade with grit chemically bonded by the coating material and coating material chemically bonded to the matrix material. Simply put, all the interfaces are joined by chemical bonds.

In another embodiment of this invention, the coated grit is packed to form a very high density mass. For example, by means of vibrational packing, monosized grit (500 micron in size) can reach a packing efficiency of about 55% (the rest, 45%, is porosity). By adding a second sized grit (70 micron), which is about 1/7 of the first sized grit, the packing efficiency can be increased to about 77%. A further addition of the third sized grit which is again about 1/7 in size of the second one, the whole mass can achieve a packing efficiency of over 83%. After the grit is packed, the mass is infiltrated by an alloy which has a melting point below the degradation temperature of the superabrasives grit. If a diamond grit is used, the temperature limit is less than about 1100° C. for synthetic grit depending on quality, and for about 1300° C. for natural grit. Because of the presence of the coating, the binder alloy infiltrates the highly packed mass of superabrasives grit relatively easily. Without the coating, most binder alloys can not infiltrate such a mass.

Following this embodiment we obtain a superabrasive-metal composite material, such as diamond-metal composite which we call "Diamet". This composite material possesses higher impact resistance than a typical polycrystalline superabrasives aggregate because of the presence of the metal binder. For example, we have obtained a Diamet mass which is tougher than a polycrystalline diamond (PCD) material when these products are subjected to impact testing.

The "Diamet" material is readily bondable onto a cemented WC substrate to form, for example, cutters useful for drill bits for earth boring applications. Such cutters with backing have been tested in a laboratory and the cutting results are comparable to those cutters made of compacts such as Geoset.

The method, according to this invention, offers many advantages. For example, it does not involve using very high pressure which is required for making a polycrystalline superabrasives aggregate such as a PCD; therefore, the cost for making this composite material can be much less than the prior art methods. The size and shape of this material can also be more flexible without being restricted by the high pressure chamber.

In order to further illustrate the practice of this invention, the following examples are included:

EXAMPLE I

A natural diamond grit available under the trade name of EMBS supplied by DeBeers Co. with a size (30/40 U.S. mesh) having a F.E.P.A. designation of D602 was coated by a tungsten layer using fluidized bed CVD method. Thus, the diamond grits were dipped in an acid solution comprising of hydroflouric and nitric acid for about 1 minute. They were rinsed in deionized water for 15 minutes followed by washing in dilute NaOH solution for 2 minutes and a further rinsing in deionized water. The cleaned grits were dried in an oven. The dried diamond grits were loaded in a chemical vapor deposition (CVD) reactor comprising a graphite tube. After the diamond grits were loaded in the reactor, argon was introduced into the reaction chamber at a pressure of about 5 torr for about 30 minutes. Thereafter, the pressure was changed to 0.5 torr to allow water to evaporate. Then a gas comprising Ar, He, H2 at 1:1:1 ratio was introduced into the chamber at a pressure of 5 torr and at flow rate of 0.21 liter per minute while the reactor was heated up to 900° C. in 16 minutes and held at 900° C. for 30 minutes. The temperature was lowered to 700° C. in 3 minutes and then the pressure was raised to 12 torr. The flow rate of the gas was increased to fluidize the diamond grits in the reactor WF6 simultaneously (tungsten hexafluoride) was introduced to effect the deposition of tungsten on the diamond reaching 11 micron in about 75 minutes. Finally, a flow of argon only was introduced to allow the reactor to cool down to room temperature. The tungsten coating thickness on the product was 7.75 micron. The coated grit was made into saw segments by hot pressing with a matrix material made of 80% Cu-Sn alloy and 20% cemented tungsten carbide grit. These segments were used to cut an abrasive concrete sample containing chert grains. The results indicated that the pull-out loss of the grit was reduced to less than 10% on the cutting surface after testing. This low pull-out loss is in sharp contrast with 40% from a parallel test using uncoated grit under identical conditions.

EXAMPLE II

A synthetic diamond grit available under the trade name SDA100 also supplied by DeBeers Co. with a size having a F.E.P.A. designation of D602 was coated with a tungsten layer of about 10 micron thickness as in Example I. The coated grit was spread out to form a plane of tightly packed monolayer in a matrix powder body made of tungsten carbide. The assembly was prepressed into shape and later hot pressed at a temperature of 815° C. and at a pressure of 3,500 psi. The hot pressed mass was in a dog-bone shape. The tensile test specimen was then subject to a pulling test (uniaxial tensile test). The results indicated the coated grit in such a geometry can support a tensile strength of 15KSI. Uncoated grit under the identical testing conditions showed virtually no tensile strength.

The above coated grit was also overcoated by an electroless deposited nickel boron layer of about 30 micron thick by a procedure supplied by Allied-Kelite division of Witco Corp. A solution comprising of nickel-boron, available from Witco Corp., was employed. In the first step of coating, the tungsten surface was cleansed using a solution such as Niklad Alprep 230 solution from Witco by heating the solution to 65.5° C. and the diamond grits were dipped in for 5 minutes. Then the diamond grits were rinsed in tap water until the foam was gone. A sensitizer available as Niklad 261, from Witco, was applied to the diamond grit surfaces by dipping the grits therein at 224° C. for 2 minutes. Then the diamond grits were rinsed in deionized water. A catalyst available under the trademark Niklad 262 was then applied to the diamond grit surface by dipping the diamond grits therein at 43° C. for 4 minutes at a PH of 1.9 to 3. Then the diamond grits were rinsed in deionized water. The treated diamond grits were dried and dipped in a Ni-B solution available as Niklad 752 solution at a PH of about 6 and at a temperature of 80° C. The nickel layer contained about 3% of boron. Under the same testing condition the tensile strength was 20KSI.

In a parallel test, a same type grit was first roughened on surfaces and then coated by the same double layers. The surface roughening was done by a milling action against diamond micron powders in a water medium. The milling lasted for 24 hours and the grit had a final weight loss of about 0.7%. Under the above test conditions, the tensile strength was increased to 35KSI.

EXAMPLE III

Tungsten coated diamond micron powders produced by the method described in Example I with size of 500 micron & 60 micron were packed by vibration to form an uniformly distributed mass of 80% packing efficiency. The mass was then infiltrated by an alloy composed of copper, manganese and titanium under vacuum at 1050° C. for 20 minutes. The "Diamet" was made into a cutter and used to cut a granite log with coolant. The wear resistance was measured and compared with other commercially available PCD materials tested under the same conditions. The results indicated that the wear resistance of "Diamet" is comparable to Geoset-type PCD supplied by General Electric Company. The latter product is made under high pressure conditions in diamond stability region. The same "Diamet" sample was also subject to an erosion test by injecting an abrasive containing mud. The erosion resistance was found to be comparable to infiltrated tungsten carbide slug which is typically used as the face of a matrix bit body. The "Diamet" material with such high wear resistance and erosion resistance is useful to form cutters in drill bits for rock drilling. The drill bits known in the art typically used PCD (such as Geoset) or tungsten carbide inserts.

EXAMPLE IV

"Diamet" cutters made according to Example III were brazed into a bit body by a typical brazing procedure known in the art employing an 8½" bit body.

What is claimed is:

1. A coated superabrasive grit, comprising superabrasive grit particles having roughened surfaces by chemical and/or mechanical systems, said superabrasive grit being selected from the group consisting of diamond and CBN, a substantially continuous first metallic coating on top of said roughened surfaces and being chemically bonded thereto, said first metallic coating being selected from the group consisting of W, Mo, Ta, Nb, and alloys thereof, and a second substantially continuous metallic coating on tope of said first metallic coating, said second metallic coating comprising nickel or copper said first and second metallic coatings having a total thickness in the range of about 1 to 50 microns.

2. A tool which comprises a coated superabrasive grit according to claim 1 which is in contact with a matrix and said matrix being bonded to a tool body.

3. A tool according to claim 2 in which the tool body is metallic.

4. A tool according to claim 2 in which the tool body is non-metallic.

5. A tool according to claim 3 which is a saw blade.

6. A tool according to claim 3 which is a drill bit.

7. A tool according to claim 2 in which the grit has a packing efficiency of more than 70% by volume.

8. A cutting tool which comprises as cutting members a surface roughened superabrasive grit according to claim 1 and said grit being an integral part of a tool.

9. A tool according to claim 8 which is in the form of a saw blade.

10. A tool according to claim 8 which is in the form of a grinding wheel.

11. A tool according to claim 8 which is in the form of a drill bit.

12. A coated superabrasive grit as defined in claim 1 wherein said first metallic coating is tungsten.

13. A coated superabrasive grit as defined in claim 1 wherein said second metallic coating comprises nickel.

14. A coated superabrasive grit as defined in claim 1 wherein said second metallic coating comprises NiB.

15. A coated superabrasive grit as defined in claim 1 wherein said first metallic coating is tungsten and said second metallic coating comprises NiB.

16. A coated superabrasive grit as defined in claim 15 wherein said first metallic coating is about 10 microns thick and said second metallic coating is about 30 microns thick.

17. A method for making a superabrasive grit, comprising roughening by chemical and/or mechanical systems the outer surfaces of superabrasive grit particles, said superabrasive grit particles being selected from the group consisting of diamond and CBN particles, applying a first substantially continuous metallic coating on top of said roughened surfaces, said first metallic coating being selected from the group consisting of W, Mo, Ta, Nb, and alloys thereof, causing said first metallic coating to bond chemically to said superabrasive grit particles, and applying a second substantially continuous metallic coating on top of said first metallic coating, said second metallic coating comprising nickel or copper.

18. The method of claim 17 wherein said superabrasive grit particles are roughened mechanically.

19. The method of claim 17 wherein said superabrasive grit particles are roughened by milling.

20. The method of claim 17 wherein said superabrasive grit particles are roughened chemically.

21. The method of claim 17 wherein said superabrasive grit particles are roughened by oxidation.

22. The method of claim 17 wherein said superabrasive grit particles are roughened by chemical etching.

* * * * *